US009507545B2

(12) United States Patent
Mizuno

(10) Patent No.: US 9,507,545 B2
(45) Date of Patent: Nov. 29, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshitake Mizuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/533,588

(22) Filed: Nov. 5, 2014

(65) Prior Publication Data

US 2015/0160895 A1 Jun. 11, 2015

(30) Foreign Application Priority Data

Nov. 7, 2013 (JP) .................................. 2013-231586

(51) Int. Cl.
*G06F 3/12* (2006.01)
*H04N 1/00* (2006.01)

(52) U.S. Cl.
CPC ........... *G06F 3/1204* (2013.01); *G06F 3/1256* (2013.01); *G06F 3/1274* (2013.01); *H04N 1/00* (2013.01); *G06F 3/1208* (2013.01); *G06F 3/1219* (2013.01)

(58) Field of Classification Search
CPC ..................... H04N 1/00411; H04N 1/00442; H04N 1/00453; H04N 1/00466; H04N 1/00713; H04N 1/387; H04N 1/3877; H04N 1/00; H04N 1/00435; H04N 1/00474; H04N 1/00795; H04N 1/00824; G03G 15/502
USPC ............. 358/1.15, 1.18, 1.9, 1.16, 450, 498; 348/E5.031, E5.085, 162, 36; 382/200, 382/293; 399/79
See application file for complete search history.

(56) References Cited

U.S. PATENT DOCUMENTS

| 6,999,198 | B1 * | 2/2006 | Nakagiri | ................ B42C 19/00 358/1.13 |
| 7,603,618 | B2 * | 10/2009 | Mori et al. | ..................... 715/229 |
| 8,285,080 | B2 * | 10/2012 | Mizuno | ............... G06K 9/2054 382/195 |
| 8,325,264 | B2 * | 12/2012 | Akita | ..................... G03B 13/04 348/333.05 |
| 8,363,284 | B2 * | 1/2013 | Mizuno | ................ G03G 21/043 283/72 |
| 8,447,193 | B2 * | 5/2013 | Mizuno | .............. G03G 15/5012 399/16 |
| 8,792,108 | B2 * | 7/2014 | Yoshida | ............. H04N 1/00442 345/204 |
| 8,830,522 | B2 * | 9/2014 | Mizuno | .............. G03G 15/5062 358/1.9 |
| 8,867,097 | B2 * | 10/2014 | Mizuno | .................. G06K 15/02 347/19 |
| 8,913,278 | B2 * | 12/2014 | Tsunekawa | ................... 358/1.15 |
| 8,917,416 | B2 * | 12/2014 | Kobayashi | ..................... 358/1.2 |

(Continued)

FOREIGN PATENT DOCUMENTS

| JP | 2010258798 A | 11/2010 |
| JP | 4610644 B2 | 1/2011 |

*Primary Examiner* — Negussie Worku
(74) *Attorney, Agent, or Firm* — Canon U.S.A., Inc. IP Division

(57) ABSTRACT

An image processing apparatus includes an instruction unit configured to, in a case where a first preview image is displayed on a display, perform an instruction to display a second preview image, the first preview image being a preview image of first image data determined to be specific image data from among a plurality of pieces of input image data, the second preview image being a preview image of second image data that is a different piece of image data from the first image data and determined to be the specific image data wherein the second image data is a page closest to the first image data from among the plurality of pieces of input image data.

18 Claims, 8 Drawing Sheets

(56) References Cited

U.S. PATENT DOCUMENTS

| | | | |
|---|---|---|---|
| 9,058,140 B2* | 6/2015 | Kurata et al. | |
| 9,100,520 B2* | 8/2015 | Nishiyama | |
| 9,158,492 B2* | 10/2015 | Miyata | G06F 3/1205 |
| 9,171,385 B2* | 10/2015 | Matsumura | G06Q 30/02 |
| 9,223,485 B2* | 12/2015 | Saito | G06F 3/04842 |
| 9,223,486 B2* | 12/2015 | Shin | G06F 3/04845 |
| 2010/0123928 A1* | 5/2010 | Morimoto et al. | 358/1.15 |
| 2011/0228044 A1* | 9/2011 | Miyamoto et al. | 348/36 |
| 2011/0267650 A1* | 11/2011 | Morita | 358/1.15 |
| 2012/0013944 A1* | 1/2012 | Ehara et al. | 358/1.15 |
| 2012/0026515 A1* | 2/2012 | Muramoto | 358/1.2 |
| 2012/0050807 A1* | 3/2012 | Noda et al. | 358/1.15 |
| 2012/0069393 A1* | 3/2012 | Shoji et al. | 358/1.15 |
| 2012/0092690 A1* | 4/2012 | Saito | 358/1.13 |
| 2012/0099128 A1* | 4/2012 | Yoshida et al. | 358/1.13 |
| 2013/0235408 A1* | 9/2013 | Yamaguchi | 358/1.13 |
| 2014/0376021 A1* | 12/2014 | Nishiyama | 358/1.13 |
| 2014/0376022 A1* | 12/2014 | Muraishi et al. | 358/1.13 |
| 2015/0160895 A1* | 6/2015 | Mizuno | G06F 3/1204 358/1.15 |
| 2015/0304520 A1* | 10/2015 | Nakamura | H04N 1/2179 358/403 |
| 2016/0014290 A1* | 1/2016 | Mizuno | H04N 1/3875 358/1.2 |

* cited by examiner

FIG. 6

| No | IMAGE DATA | BLANK SHEET DETERMINATION LEVEL 1 | BLANK SHEET DETERMINATION LEVEL 2 | VALID FLAG | CHECKED FLAG |
|---|---|---|---|---|---|
| 1 |  | BLANK SHEET | BLANK SHEET | DELETE | PREVIEWED |
| 2 |  | BLANK SHEET | CONTENTS | SAVE | PREVIEWED |
| 3 | ABC | CONTENTS | CONTENTS | — | — |
| 4 |  | BLANK SHEET | BLANK SHEET | NOT SET | NOT DISPLAYED |
| 5 | ABC | CONTENTS | CONTENTS | — | — |

IMAGE PROCESSING APPARATUS, IMAGE PROCESSING METHOD, AND STORAGE MEDIUM

BACKGROUND

Field

Aspects of the present invention generally relate to an image processing apparatus that determines whether image data to be processed is image data including print information or image data not including print information.

Description of the Related Art

Existing image processing apparatuses can read a document by using an auto document feeder (ADF), detect image data of a blank sheet not including print information from the read image data, and delete the image data of a blank sheet from a memory.

Japanese Patent No. 4610644 discusses a technique for previewing a plurality of pieces of read image data to check for image data determined not to include print information. In the technique, the image data determined not to include print information and image data determined to include print information may both be displayed. Only the image data determined to include print information may be displayed without displaying the image data determined not to include print information.

Japanese Patent Application Laid-Open No. 2010-258798 discusses a technique for generating and displaying preview images of only image data determined not to include print information. Japanese Patent Application Laid-Open No. 2010-258798 also discusses an image processing apparatus that can display the preview images along with ones of image data read immediately before and after the image data determined not to include print information, and display the preview images along with information about a document type.

According to the foregoing conventional configuration, a plurality of pieces of image data is previewed on a display screen at a time. Page turning operations (operations for switching the display screen to the next screen) are therefore required for such a preview display, in which case a user may miss a preview image corresponding to image data determined not to include print information. If preview images corresponding to image data determined not to include print image are displayed alone, it is difficult to check where the image data determined not to include print information is positioned in the entire plurality of pieces of read image data. Moreover, it is burdensome and complicated for the user to perform an operation to activate a display mode only for displaying preview images corresponding to image data determined not to include print information solely for the purpose of checking the presence or absence of image data determined not to include print information.

SUMMARY

According to an aspect of the present invention, an image processing apparatus includes a determination unit configured to determine whether a plurality of pieces of input image data is specific image data, a display control unit configured to display a preview image of the plurality of pieces of input image data on a display unit, and an instruction unit configured to, in a case where a first preview image is displayed on the display unit, perform an instruction to display a second preview image, the first preview image being a preview image of first image data determined to be the specific image data by the determination unit, the second preview image being a preview image of second image data that is a different piece of image data from the first image data and determined to be the specific image data by the determination unit, wherein the second image data is a page closest to the first image data from among the plurality of pieces of input image data.

The present disclosure is directed to a technique for displaying by a display method that, when displaying preview images corresponding to a respective plurality of pieces of image data on a screen, facilitates recognizing where image data determined not to include print information is positioned in the entire plurality of pieces of image data.

Further features of the present disclosure will become apparent from the following description of exemplary embodiments with reference to the attached drawings.

BRIEF DESCRIPTION OF THE DRAWINGS

FIG. 6 is a diagram illustrating an image data structure.

DESCRIPTION OF THE EMBODIMENTS

Various exemplary embodiments will be described in detail below with reference to the drawings.

Figure 1:
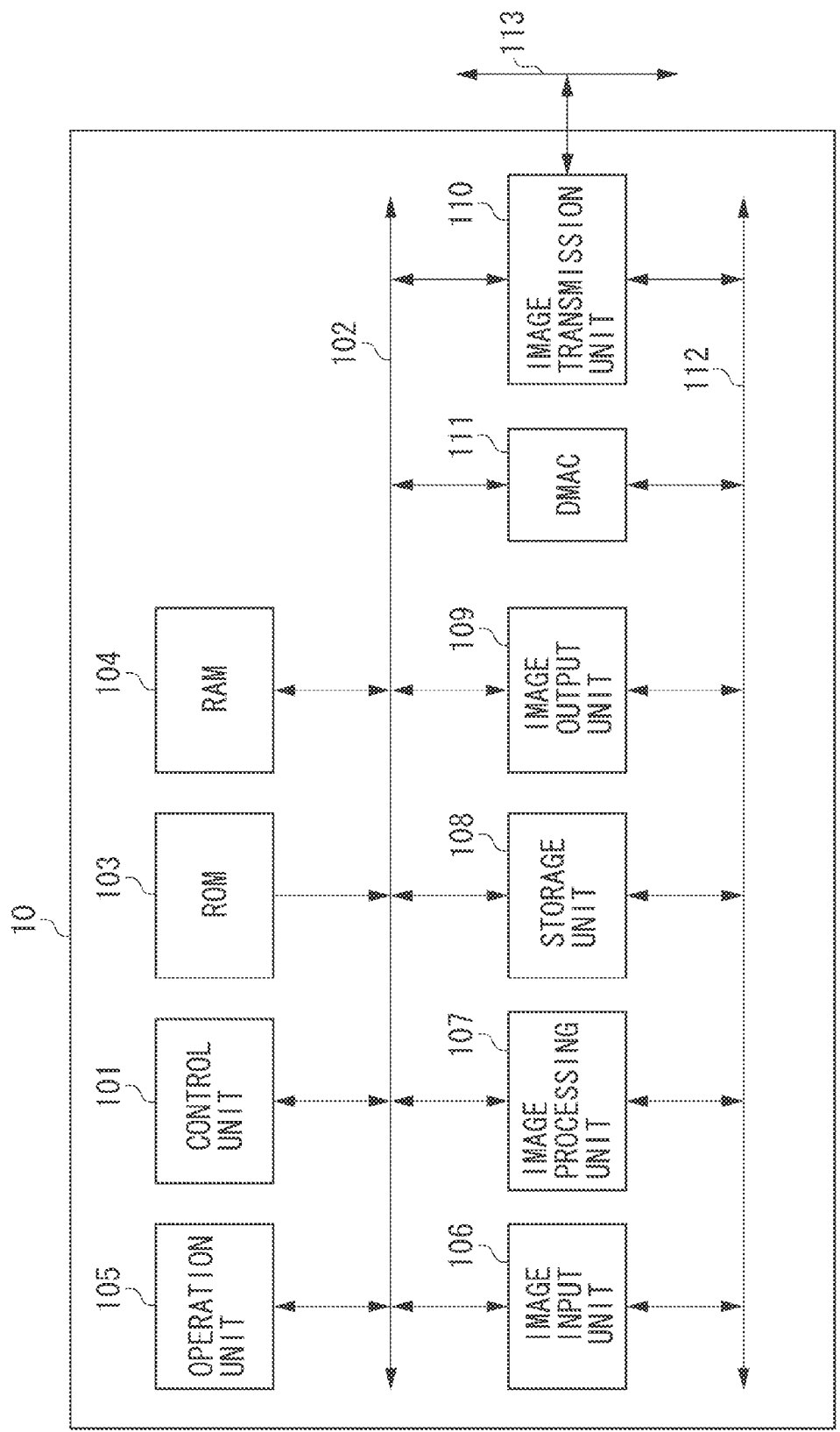
FIG. 1 is a block diagram illustrating an example of a configuration of an image processing apparatus according to a first exemplary embodiment.

FIG. 1 is a block diagram illustrating a configuration example of an image processing apparatus 10 as an example of a display control apparatus according to a first exemplary embodiment. A control unit 101 controls the entire image processing apparatus 10. The control unit 101 includes a central processing unit (CPU). A control bus 102 connects the control unit 101 with various blocks. A read only memory (ROM) 103 stores a program to be executed by the control unit 101. A random access memory (RAM) 104 is used as a temporary storage of control data and/or a work memory during control of the control unit 101. An operation unit 105 includes a display device, such as a liquid crystal display (LCD) panel, and a position input device, such as a touch pad. Through the operation unit 105, a user gives instructions, for example, about an operation of the image processing apparatus 10. An image input unit 106 reads image data on a document. An image processing unit 107 performs image processing on the image data read by the image input unit 106. A storage unit 108 stores input/output data of the image input unit 106 and/or the image processing unit 107.

As will be described below, the storage unit 108 further stores information indicating whether the image data includes print information, along with the image data.

The storage unit 108 includes a hard disk drive (HDD), a solid state drive (SSD), a double data rate synchronous dynamic random access memory (DDR-SDRAM), and the like.

An image output unit 109 prints and outputs image data processed by the image processing unit 107. An image transmission unit 110 transits the image data of the document read by the image input unit 106, the image data processed by the image processing unit 107, and the image data stored in the storage unit 108. A direct memory access controller (DMAC) 111 performs data transfer control between the image input unit 106, the image processing unit 107, the storage unit 108, the image output unit 109, and the image transmission unit 110 based on control of the control unit 101. A bus 112 performs data transfer according to the DMAC 111. A communication network 113 is a communication network (local area network (LAN) and the like) outside the image processing apparatus 10. The communication network 113 is connected to the image transmission unit 110.

<Configuration of Image Input Unit 106>

Figure 2:
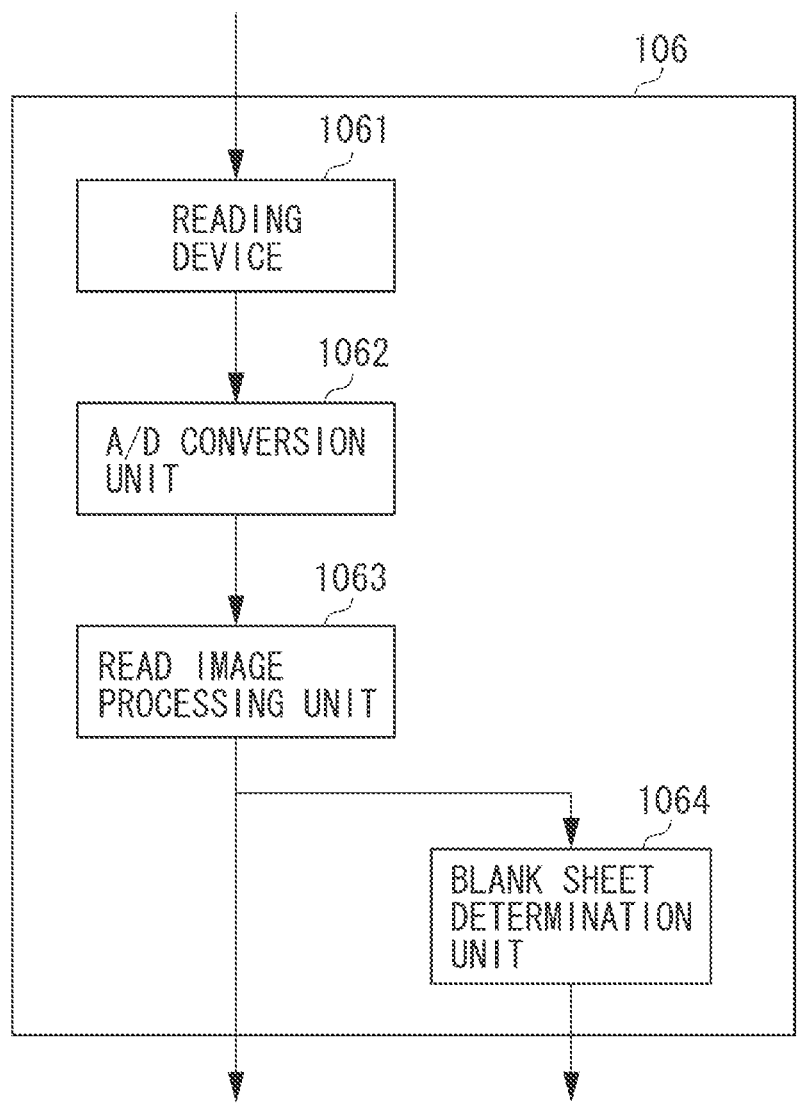
FIG. 2 is a block diagram illustrating an example of an internal configuration of an image input unit.

A configuration of the image input unit 106 will be described with reference to FIG. 2. FIG. 2 is a diagram illustrating the internal configuration of the image input unit 106. In FIG. 2, a reading device 1061 includes a charge-coupled device (CCD), a complementary metal oxide semiconductor (CMOS), or a contact image sensor (CIS). The image input unit 106 reads image data on a document via the reading device 1061. The read analog image data is output to subsequent-stage processing units. An analog-to-digital (A/D) conversion unit 1062 digitally converts the image data read by the reading device 1061. A read image processing unit 1063 performs processing, such as shading correction, modulation transfer function (MTF) correction, and high frequency suppression processing. The shading correction adjusts the levels of highlight portions (white) and dark portions (black) of the read image data. A blank sheet determination unit 1064 refers to the image data processed by the read image processing unit 1063, and determines whether the read image data includes print information, i.e., whether the image data is of a blank sheet.

A blank sheet as employed herein refers to a document that is determined not to include print information (i.e., contents). If there is no print information, a colored document, such as colored paper is also handled as a blank sheet. Recycled paper is also handled as a blank sheet. In other words, the blank sheet determination determines the presence or absence of contents printed on the document. Hereinafter, image data read from such a blank sheet and read image data including only show-throughs will also be referred to as a blank sheet. In contrast, a document including a small amount of characters or low-density characters in halftone dots is not a blank sheet. Image data obtained by reading a sheet including handwritten or printer-printed print information will be referred to as content data.

<Blank Sheet Determination Method>

A method for determining a blank sheet by the blank sheet determination unit 1064 includes, for example, detecting a blank sheet by using a frequency distribution of luminance values of the image data processed by the read image processing unit 1063. Based on the image data output from the read image processing unit 1063, the blank sheet determination unit 1064 generates a frequency distribution of read image data obtained by reading a sheet of the document. The blank sheet determination unit 1064 then obtains an average value and a variance value from the generated frequency distribution. The reason for obtaining the variance value is to utilize the characteristic that a calculated variance value increases if the read image data on the document includes significant information (print information).

In the present exemplary embodiment, the method using a frequency distribution is described as the method for determining a blank sheet. However, the method is not limited to the above-described method. For example, a processing unit for detecting edges of read image data may be provided to count pixels that are determined to be an edge. The blank sheet determination unit 1064 may then determine a blank sheet according to the count value. The blank sheet determination unit 1064 may determine a blank sheet based on a combination of the frequency distribution, the variance value, and the number of edges.

If the blank sheet determination is performed by the above-described technique, the determination criterion (threshold value) which is used by the image processing unit 10 to determine obtained image data as a blank sheet can be set. If the image processing unit 10 performs the blank sheet determination by using the variance value of the frequency distribution, image data of which variance value is higher than a threshold value can be determined to be content data. Image data of which variance value is lower than the threshold value can be determined to be a blank sheet. In other words, to make image data more likely to be determined to be a blank sheet, the threshold value for the determination is set to be higher. To make image data less likely to be determined to be a blank sheet, the threshold value is set to be lower. In the following description, the blank sheet determination unit 1064 shall be configured to be capable of setting a blank sheet determination level.

The image input unit 106 outputs the image data obtained by performing the processing of the read image processing unit 1063 on the image data of the read document and a blank sheet determination result obtained by the blank sheet determination unit 1064. If a frequency distribution and a variance value calculated from the frequency distribution are used for the blank sheet determination, the blank sheet determination can be performed using a plurality of determination levels for a single operation of reading a document performed by the image input unit 106. Specifically, the image input unit 106 applies a plurality of threshold values of different determination levels to the obtained variance value to obtain a blank sheet determination result for each threshold value. The image input unit 106 therefore does not need to read the same document for a plurality of times for each blank sheet determination level.

The blank sheet determination unit 1064 may output only one of the blank sheet determination results that is based on a blank sheet determination level set by the user of the image processing apparatus 10. The blank sheet determination unit 1064 may output the blank sheet determination results of all the blank sheet determination levels which can be set for the image processing unit 10 used in the present exemplary embodiment. Suppose that the blank sheet determination unit 1064 outputs only a blank sheet determination result that is based on the blank sheet determination level set by the user of the image processing apparatus 10. In such a case, the blank sheet determination unit 1064 outputs 1 if the image data is determined to be a blank sheet, and outputs 0 if the image data is determined not to be a blank sheet. Suppose that the number of possible blank sheet determination levels of the image processing unit 10 used in the present exemplary embodiment is three. In such a case, the blank sheet determination unit 1064 may output three blank sheet determination results in combination, like "011" in order of the unlikeliness of determination to be a blank sheet, i.e., in ascending order of blank sheet determination level. Which blank sheet determination level the blank sheet determination result is in may be made identifiable at the time of reading a document. For example, suppose that the blank sheet determination results are "011" in the foregoing order and the blank sheet determination level set in advance is the second in terms of the likeliness of determination to be a blank sheet (the blank sheet determination level is the second highest). In such a case, the blank sheet determination result ("1," i.e., a blank sheet) and information indicating that "the blank sheet determination level is set to the second highest" are both displayed so that they can be referred to.

The output data of the image input unit 106 and the blank sheet determination result are transferred to the storage unit 108 via the DMAC 111 based on control of the control unit 101. The storage unit 108 temporarily stores the image data and the blank sheet determination result transferred via the DMAC 111.

The image processing unit 107 generates a preview image of the obtained image data based on the image data and the blank sheet determination result stored in the storage unit 108.

In the following description, the present exemplary embodiment deals with image data not including print information (image data obtained by reading a blank document) as an example of specific image data. Any image data from which features, such as color, a specific image, a character, a shape, and a size can be detected may be handled as specific image data.

<Operation Unit>

Figure 3:
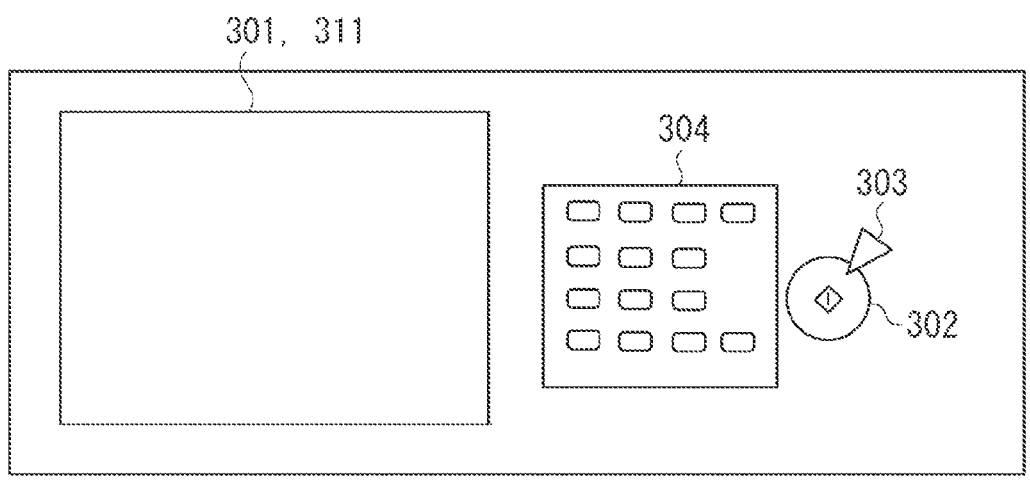
FIG. 3 is a plan view illustrating an example of a configuration of an operation unit.

FIG. 3 is a plan view illustrating an example of a configuration of the operation unit 105 illustrated in FIG. 1.

In FIG. 3, an image display unit 301 includes a liquid crystal display panel or an organic electroluminescent (EL) panel. The image display unit 301 and a contact detection unit 311 to be described later constitute a touch panel display. A start key 302 is used when starting an operation for reading a document image. A stop key 303 functions to stop a currently-running operation. A numerical keypad 304 includes a group of numeral and character buttons. The numerical keypad 304 is used to set the number of copies and give instructions about screen switching of the image display unit 301. The contact detection unit 311 is arranged on the image display unit 301 and can detect the following operations that:

(1) the touch panel display is touched with a finger or pen (hereinafter, referred to as a touch-down),
(2) a finger or pen is touching the touch panel display (hereinafter, referred to as a touch-on),
(3) a finger or pen moves in contact with the touch panel display (hereinafter, referred to as a move),
(4) a finger or pen having been in contact with the touch panel is released (hereinafter, referred to as a touch-up), and
(5) nothing is touching the touch panel display (hereinafter, referred to as a touch-off).

The contact detection unit 311 notifies the control unit 101 of information about such operations detected and position coordinates where the touch panel display is touched with the finger or pen. Based on the notified information, the control unit 101 determines what operation is made on the touch panel display. For a move, the contact detection unit 311 further detects the direction of movement of the finger or pen moving over the touch panel display in terms of both vertical and horizontal components on the touch panel display based on a change of the position coordinates. If a touch-down on the touch panel display is followed by a certain move and a touch-up, the contact detection unit 311 detects that a stroke is drawn. An operation of drawing a quick stroke will hereinafter be referred to as a flick. A flick is an operation of quickly moving a finger by some distance in touch with the touch panel display and releasing the finger directly, i.e., an operation of quickly running a finger along the touch panel display as if flicking. If the contact detection unit 311 detects a move over a predetermined distance or more, directly followed by a touch-up, then the contact detection unit 311 determines that a flick is made. If the contact detection unit 311 detects a move over a predetermined distance or more at less than a predetermined speed, the contact detection unit 311 determines that a drag is performed.

Figure 4:
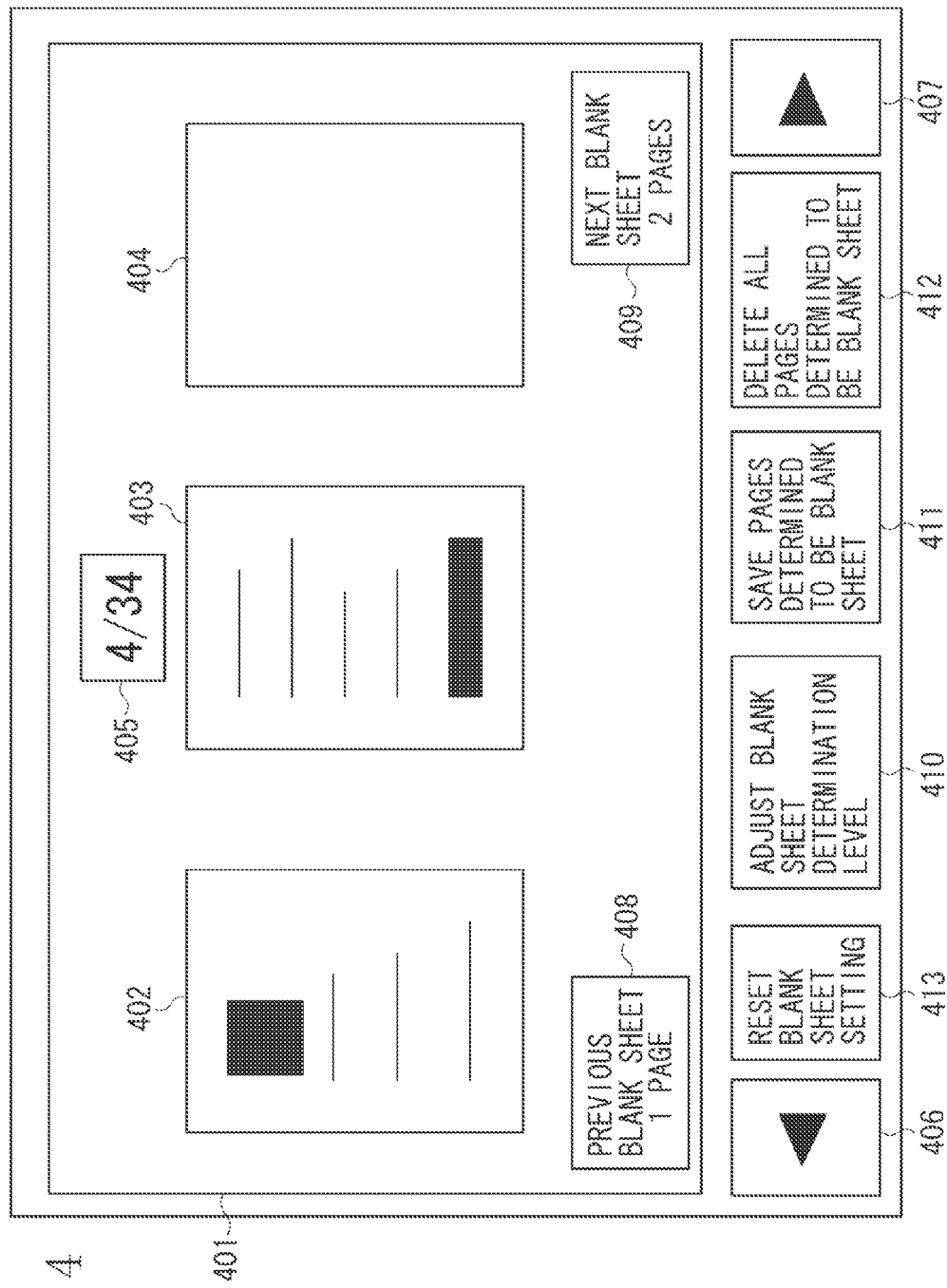
FIG. 4 is a diagram illustrating an example of a screen displayed on an image display unit.

FIG. 4 is a diagram illustrating an example of a preview screen displayed on the image display unit 301.

A preview image display section 401 is an area for displaying image data for preview display which is generated by the image processing unit 107. This area displays generated images for preview display (preview images) 402, 403, and 404. The image for preview display 404 represents a preview image of image data that is determined to be a blank sheet by the blank sheet determination unit 1064. A page number 405 indicates the total number of pages of the read document and the page number of the image currently displayed in the center. A previous button 406 is a button for displaying the preview image of the previous page. A next button 407 is a button for displaying the preview image of the next page.

A previous blank sheet button 408 is a button for displaying a preview image of image data that is determined to be a blank sheet from among the pieces of image data read before the image data corresponding to the preview image 402.

The previous blank sheet button 408 is pressed to display image data that is determined to be a blank sheet from among the pieces of image data read before the image data corresponding to the preview image 402 and is read immediately before the image data corresponding to the preview image 402. The previous blank sheet button 408 further displays the remaining number of pages determined to be a blank sheet from among the pages preceding the one being previewed in the center.

A next blank sheet button 409 is a button for displaying a preview image of image data that is determined to be a blank sheet from among the pieces of image data read after the image data corresponding to the preview image 404.

The next blank sheet button 409 is pressed to display image data that is determined to be a blank sheet from among the pieces of image data read after the image data corresponding to the preview image 404 and is read immediately after the image data corresponding to the preview image 404. The next blank sheet button 409 further displays the remaining number of pages determined to be a blank sheet from among the pages subsequent to the one being previewed in the center.

An adjust blank sheet determination level button 410 is pressed to display a screen for adjusting a threshold value used to determine image data to be a blank sheet. From the screen, the user can adjust the threshold value, for example, so that read image data is more likely to be determined to be a blank sheet. While the present exemplary embodiment deals with an example of adjusting the blank sheet determination level, the adjustment is not limited to that of the strength of determination. For example, blank sheet determination logic may be modified. Now, suppose, for example, that a document is scanned, the blank sheet determination is performed at the time of transmission, and the user wants to transmit image data determined to be a blank sheet along with image data determined not to be a blank sheet. In such a case, the user presses a save pages determined to be a blank sheet button 411. This can transmit all the read pages including the image data determined to be a blank sheet. A delete all pages determined to be a blank sheet button 412 can be pressed, for example, when scanning and transmitting a document, to delete image data determined to be a blank sheet from the image data to be processed so that the remaining image data is transmitted. A reset blank sheet setting button 413 is pressed to clear the setting operation on the image data determined to be a blank sheet and restore the state of the image data to the state immediately after scanning.

Figure 5:
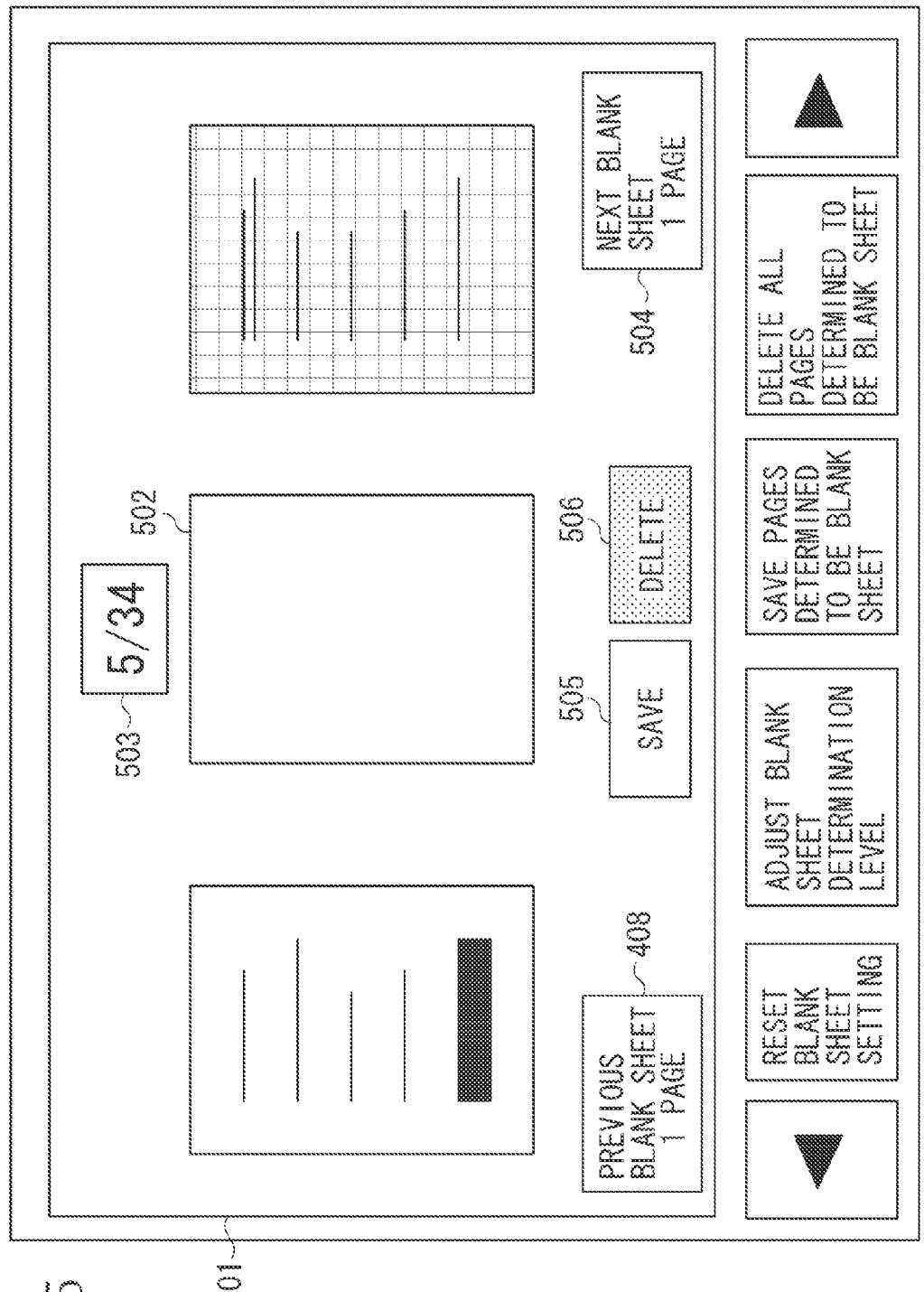
FIG. 5 is a diagram illustrating an example of the screen displayed on the image display unit.

FIG. 5 is a diagram illustrating an example of the preview screen displayed on the image display unit 301. A preview image display section 501 is an area for displaying the image data for preview display generated by the image processing unit 107. A preview image 502 represents image data determined to be a blank sheet by the blank sheet determination unit 1064. A page number 503 indicates the total number of pages of the read document and the page number of the preview image currently displayed in the center.

A next blank sheet button 504 is a button for displaying a preview image of image data that is determined to be a blank sheet from among the pieces of image data read after the image data being previewed. The next blank sheet button 504 further displays the remaining number of pages determined to be a blank sheet from among the pages subsequent to the one being previewed in the center.

In the example illustrated in FIG. 5, the preview image 502 of the image data corresponding to the preview image 404, which is not displayed in the center in FIG. 4, is displayed in the center of the display screen.

The remaining number of pages displayed in the next blank sheet button 409 illustrated in FIG. 4 is two. In the example illustrated in FIG. 5, the remaining number of pages displayed is one, excluding the page of the preview image 502.

In FIG. 5, unlike FIG. 4, the preview image 502 of the image data determined to be a blank sheet is displayed in the center of the preview screen, along with buttons 505 and 506.

The button 505 is a button for saving the image data determined to be a blank sheet. Suppose the case of scanning and transmitting a document, and when a preview image of image data determined to be a blank sheet is displayed, the user can press the button 505 to transmit the previewed image data determined to be a blank sheet as part of data to be processed. The button 506 is a button for deleting a page determined to be a blank sheet. When a preview image of image data determined to be a blank sheet is displayed, the user can press the button 506 to transmit data to be processed without including the image data determined to be a blank sheet.

In such a manner, the user can determine subsequent processing (whether to save or delete) about image data determined to be a blank sheet via the preview screen.

As described above, the previous and next blank sheet buttons for shifting to the previous and next pages determined to be a blank sheet are displayed on the normal preview display screen which displays all the read image data. The user can press the previous and next blank sheet buttons to display the preview images of the pages that are determined to be a blank sheet and are not being displayed on the display screen.

FIG. 6 is a diagram illustrating an image data structure. This image data structure is stored in the storage unit 108 along with images. Input image data 602 is stored with an index 601. In the example illustrated in FIG. 6, a determination result 603 obtained by using a blank sheet determination method shows a determination result obtained by using blank sheet determination level 1. In the example illustrated in FIG. 6, a determination result 604 obtained by using a blank sheet determination method different from that of the determination result 603 is one obtained by using blank sheet determination level 2. Image data to be determined is less likely to be determined to be a blank sheet with the blank sheet determination level 2 than with the blank sheet determination level 1 of the determination result 603. Immediately after scanning or after the reset blank sheet setting button 413 is pressed during preview, a valid flag 605 indicates a not-set state for all the pieces of image data. If the button 505 for saving is pressed about a page determined to be a blank sheet during preview, the valid flag 605 is set so that when scanning and transmitting the document, the page is saved as data to be processed. If the button 506 for deleting a page determined to be a blank sheet is pressed, the valid flag 605 is set so that when scanning and transmitting the document, the page is deleted from the data to be processed.

If image data is previewed in the center (the preview image 502) of the preview screen, a checked flag 606 is set to indicate that the image data is previewed.

The checked flag 606 does not need to be provided separate from the valid flag 605.

When image data to be determined is previewed in the center of the preview screen (the preview image 502), the page to be previewed may be shifted to another page without setting the valid flag 605. The preview may be ended without the user pressing either of the buttons 505 and 506. In such cases, the image data to be determined is saved by default.

Information 607 is about the blank sheet determination result of the image data on the first page of the read document. Specifically, the image data is determined to be a blank sheet by using both of the blank sheet determination levels 1 and 2. The information 607 indicates that the image data is previewed, the button 506 for deleting (hereinafter, referred to as a delete button 506) is pressed at the time of preview, and the image data is therefore specified to be deleted from the data to be processed.

Information 608 is about the blank sheet determination result of the image data on the second page of the read document. Specifically, the image data is determined to be a blank sheet when the blank sheet determination level 1 is used. The information 608 indicates that the image data is previewed, the button for saving 505 (hereinafter, referred to as a save button 505) is pressed at the time of preview, and the image data is therefore specified to be saved.

Information 609 is about the blank sheet determination result of the image data on the third page of the read document. Specifically, the image data is determined not to be a blank sheet by using either of the blank sheet determination levels 1 and 2. The information 609 thus indicates that neither of the delete button 506 and the save button 505 is displayed for the page at the time of preview.

Information 610 is about the blank sheet determination result of the image data on the fourth page of the read document. Specifically, the image data is determined to be a blank sheet by using both of the blank sheet determination levels 1 and 2. The information 610 further indicates that the page is not previewed yet.

Information 611 is about the blank sheet determination result of the image data on the fifth page of the read document. Specifically, the image data is determined not to be a blank sheet by using either of the blank sheet determination levels 1 and 2. The information 611 further indicates that the page is not previewed yet.

Figure 7A:
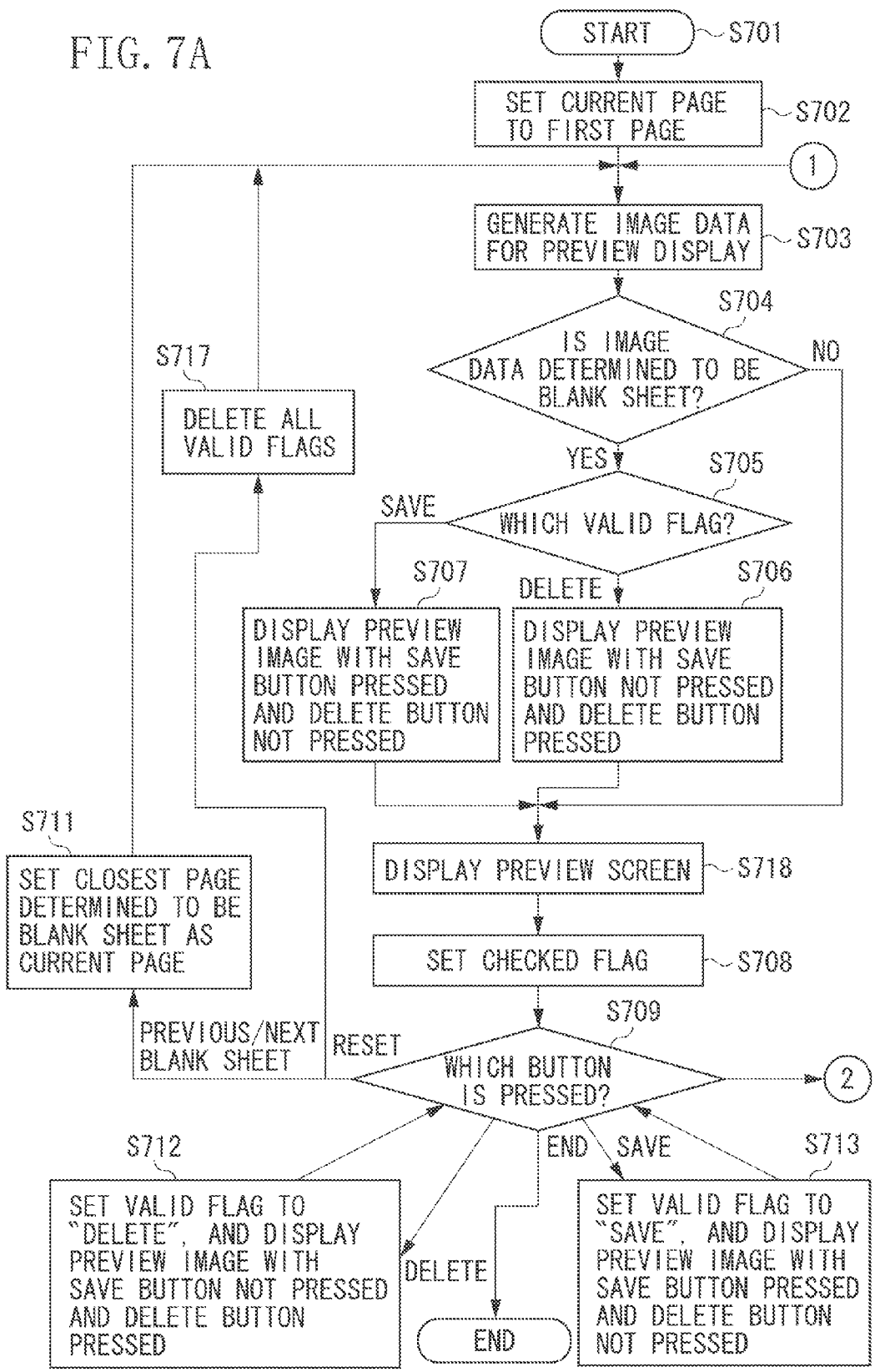
FIGS. 7A and 7B are a flowchart illustrating a flow of display control processing.
Figure 7B:
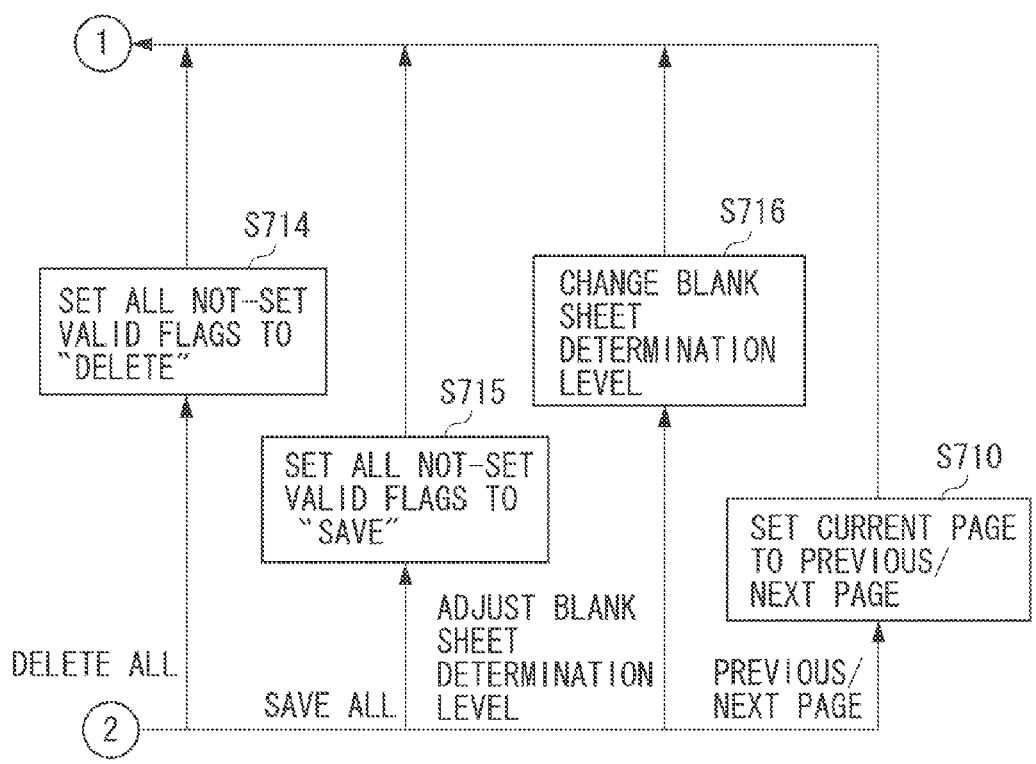

Next, a processing procedure for displaying image data for preview display generated by the image processing unit 107 on the preview image display section 401 will be described with reference to the flowchart of FIGS. 7A and 7B. This operation is implemented by the control unit 101 loading a program stored in the ROM 103 into the RAM 104 and executing the program.

In step S701, the control unit 101 displays a preview screen as illustrated in FIG. 4 or 5. In step S702, the control unit 101 sets the first page as a current page. The image data on the page set as the current page is the image data to be processed. In step S703, the image processing unit 107 generates image data for preview display based on image data structure stored in the storage unit 108 and blank sheet determination results. In step S704, the control unit 101 determines whether the image data corresponding to the image data for preview display is determined to be a blank sheet according to any of a plurality of blank sheet determination criteria, such as the blank sheet determination levels 1 and 2. In step S704, if the preview image is determined to be that of image data determined not to be a blank sheet (NO in step S704), the processing proceeds to S718. In step S718, the control unit 101 displays the image data on a normal preview screen without displaying the save button 505 or the delete button 506 on the preview screen.

In step S704, if the preview image is that of image data determined to be a blank sheet according to any of the plurality of blank sheet determination criteria, such as the blank sheet determination levels 1 and 2 (YES in step S704), the processing proceeds to step S705. In step S705, if the valid flag 605 of the image data structure indicates that the image data is to be saved (SAVE in step S705), the processing proceeds to step S707.

In step S705, if the valid flag 605 of the image data structure indicates that the image data is to be deleted (DELETE in step S705), the processing proceeds to step S706.

In step S705, the valid flag 605 of the image data structure may be not set. In such a case, if the determination result according to the currently-selected blank sheet determination criterion indicates that the image data is a blank sheet, the processing proceeds to step S706. If the determination result indicates that the image data is determined not to be a blank sheet, the processing proceeds to step S707.

In step S706, the control unit 101 displays the preview image of the image data to be processed on the operation unit 105 with the save button 505 not pressed and the delete button 506 pressed.

In step S707, the control unit 101 displays the preview image of the image data to be processed on the operation unit 105 with the save button 505 pressed and the delete button 506 not pressed.

In step S718, the control unit 101 displays a preview image data display screen on the operation unit 105. After the preview display, in step S708, the control unit 101 sets the checked flag 606 of the image data structure. In step S709, the control unit 101 waits until the user presses a button on the operation unit 105.

In step S709, if the previous or next button 406 or 407 for switching to the previous or next page is pressed (PREVIOUS/NEXT PAGE in step S709), then in step S710, the control unit 101 sets the current page to the previous or next page, and returns to step S703. In step S709, if the previous or next blank sheet button 408 or 409 for switching to the previous or next blank sheet is pressed (PREVIOUS/NEXT BLANK SHEET in step S709), the processing proceeds to step S711. In step S711, the control unit 101 sets the closest page in the image data structure that is determined to be a blank sheet based on any of the blank sheet determination criteria as the current page, and the processing returns to step S703.

In step S709, if the delete button 506 is pressed (DELETE in step S709), the processing proceeds to step S712.

In step S712, the control unit 101 sets the valid flag 605 of the image data to be processed to "delete." The control unit 101 displays the preview image of the image data to be processed on the operation unit 105 with the save button 505 not pressed and the delete button 506 pressed. The processing then returns to step S709.

In step S709, if the save button 505 is pressed (SAVE in step S713), the processing proceeds to step S713.

In step S713, the control unit 101 sets the valid flag 605 of the image data to be processed to "save." The control unit 101 displays the preview image of the image data to be processed on the operation unit 105 with the save button 505 pressed and the delete button 506 not pressed. The processing then returns to step S709.

In step S709, if the delete all pages determined to be a blank sheet button 412 is pressed (DELETE ALL in step S709), the processing proceeds to step S714.

In step S714, the control unit 101 changes flags not yet set among the valid flags 605 of image data in the entire image data structure to "delete." The processing then returns to step S703.

In step S709, if the save pages determined to be a blank sheet button 411 is pressed (SAVE ALL in step S715), the processing proceeds to step S715.

In step S715, the control unit 101 changes flags not yet set among the valid flags 605 of image data in the entire image data structure to "save." The processing then returns to step S703.

In step S709, if the adjust blank sheet determination level button 410 is pressed (ADJUST BLANK SHEET DETERMINATION LEVEL in step S709), the processing proceeds to step S716. In step S716, the control unit 101 changes the blank sheet determination level. The control unit 101 stores the result of the blank sheet determination performed on the image data with the changed blank sheet determination level into the image data structure, and the processing returns to step S703.

In step S709, if the reset blank sheet setting button 413 is pressed (RESET in step S709), the processing proceeds to step S717. In step S717, the control unit 101 deletes all the valid flags 605 in the entire image data structure to unset all the valid flags 605 on the image data determined to be a blank sheet, and the processing returns to step S703.

In such a manner, instructions about the image data corresponding to preview images can be given via the preview screen.

As described above, according to the present exemplary embodiment, when the preview image for each of the plurality of pieces of image data is displayed, the user can easily recognize where image data of a blank sheet determined not to include print information is in the entire plurality of pieces of image data.

Preview images of image data on pages determined to be a blank sheet preceding and subsequent to the image data corresponding to the currently-displayed preview data can also be displayed.

Image data determined to be a blank sheet can be included as that to be output, and image data to be output can be excluded as image data not to be output, by simple operations via the screen.

As a result, the editing operability of the read image data is significantly improved.

An exemplary embodiment can be implemented by executing the following processing. The processing includes supplying software (program) for implementing the functions of the foregoing exemplary embodiment to a system or an apparatus via a network or various types of storage media, and reading and executing the program by a computer (or a CPU or micro processing unit (MPU)) of the system or apparatus.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-231586 filed Nov. 7, 2013, which is hereby incorporated by reference herein in its entirety.

What is claimed is:

1. An image processing apparatus comprising: a determination unit configured to determine whether each of a plurality of pieces of input image data is a blank sheet; a display control unit configured to display a preview image of the plurality of pieces of input image data on a display unit; and an instruction unit configured to, in a case where a first preview image is displayed on the display unit and a second preview image is not displayed on the display unit, perform an instruction to display a second preview image, the first preview image being a preview image of first image data determined to be the blank sheet by the determination unit, and the second preview image being a preview image of second image data that is different from the first image data, and determined to be the blank sheet by the determination unit, wherein the second image data is a page closest to the first image data from among the plurality of pieces of input image data, and wherein at least one of the determination unit, the display control unit, and the instruction unit are implemented by a processor.

2. The image processing apparatus according to claim 1, wherein the second image data is image data that is input before the first image data from among the plurality of pieces of input image data and determined to be the blank sheet.

3. The image processing apparatus according to claim 1, wherein the second image data is image data that is input after the first image data from among the plurality of pieces of input image data and determined to be the blank sheet.

4. The image processing apparatus according to claim 1, wherein in a case where the first preview image is displayed on the display unit and an instruction to delete is performed for the first image data, the plurality of pieces of input image data, when transmitted, is transmitted with the first image data deleted from the plurality of pieces of input image data.

5. The image processing apparatus according to claim 1, wherein in a case where the first preview image is displayed on the display unit and an instruction to save is performed for the first image data, the plurality of pieces of input image data, when transmitted, is transmitted without deleting the first image data from the plurality of pieces of input image data.

6. An image processing method comprising: determining whether each of a plurality of pieces of input image data is a blank sheet; displaying a preview image of the plurality of pieces of input image data on a display unit; and performing, in a case where a first preview image is displayed on the display unit and a second preview image is not displayed on the display unit, an instruction to display a second preview image, the first preview image being a preview image of first image data determined to be the blank sheet, and the second preview image being a preview image of second image data that is different from the first image data, and determined to be the blank sheet, wherein the second image data is a page closest to the first image data from among the plurality of pieces of input image data.

7. The image processing method according to claim 6, wherein the second image data is image data that is input before the first image data from among the plurality of pieces of input image data and determined to be the blank sheet.

8. The image processing method according to claim 6, wherein the second image data is image data that is input after the first image data from among the plurality of pieces of input image data and determined to be the blank sheet.

9. The image processing method according to claim 6, wherein in a case where the first preview image is displayed on the display unit and an instruction to delete is performed for the first image data, the plurality of pieces of input image data, when transmitted, is transmitted with the first image data deleted from the plurality of pieces of input image data.

10. The image processing method according to claim 6, wherein in a case where the first preview image is displayed on the display unit and an instruction to save is performed for the first image data, the plurality of pieces of input image data, when transmitted, is transmitted without deleting the first image data from the plurality of pieces of input image data.

11. A non-transitory computer-readable storage medium storing computer-executable instructions that cause a computer to execute a control method, the control method comprising:
determining whether each of a plurality of pieces of input image data is a blank sheet;
displaying a preview image of the plurality of pieces of input image data on a display unit; and
performing, in a case where a first preview image is displayed on the display unit and a second preview image is not displayed on the display unit, an instruction to display a second preview image, the first preview image being a preview image of first image data determined to be the blank sheet, and the second preview image being a preview image of second image data that is different from the first image data, and determined to be the blank sheet, wherein the second image data is a page closest to the first image data from among the plurality of pieces of input image data.

12. An image processing apparatus comprising:
a determination unit configured to determine whether each of a plurality of pages of input image data is blank or not;
a display control unit configured to display preview images each corresponding to one of the plurality of pages of the input image data on a display unit; and
an instruction unit configured to perform an instruction to display a preview image of a page that is not displayed on the display unit and has been determined as blank by the determination unit,
wherein the display control unit is further configured to display, based on the instruction performed by the instruction unit, the preview image of the page that is not displayed on the display unit and has been determined as blank by the determination unit and a preview image of at least one page adjacent to the page that has been instructed to be displayed in the instruction.

13. The image processing apparatus according to claim 12, wherein the instruction unit is configured to perform an instruction to display, on the display unit, a preview image of a page that is the nearest to a page that is displayed among pages that have been determined as blank by the determination unit.

14. The image processing apparatus according to claim 12, wherein the instruction unit is configured to perform an instruction to display, on the display unit, a preview image of a page that is the nearest to a page that has been determined as blank by the determination unit and whose preview image is displayed among pages that have been determined as blank by the determination unit.

15. An image processing method comprising:
determining whether each of a plurality of pages of input image data is blank or not;
displaying preview images each corresponding to one of the plurality of pages of the input image data on a display unit;
performing an instruction to display a preview image of a page that is not displayed on the display unit and has been determined as blank in the determining; and
displaying, based on the instruction, the preview image of the page that is not displayed on the display unit and has been determined as blank in the determining and a preview image of at least one page adjacent to the page that has been instructed to be displayed in the instruction.

16. The image processing method according to claim 15, wherein the instruction is an instruction to display, on the display unit, a preview image of a page that is the nearest to a page that is displayed among pages that have been determined as blank in the determining.

17. The image processing method according to claim 15, wherein the instruction is an instruction to display, on the display unit, a preview image of a page that is the nearest to a page that has been determined as blank in the determining and whose preview image is displayed among pages that have been determined as blank in the determining.

18. A non-transitory computer-readable storage medium storing computer-executable instructions that cause a computer to execute a control method, the control method comprising:
determining whether each of a plurality of pages of input image data is blank or not;
displaying preview images each corresponding to one of the plurality of pages of the input image data on a display unit;
performing an instruction to display a preview image of a page that is not displayed on the display unit and has been determined as blank in the determining; and
displaying, based on the instruction, the preview image of the page that is not displayed on the display unit and has been determined as blank in the determining and a preview image of at least one page adjacent to the page that has been instructed to be displayed in the instruction.

* * * * *